AIRBORNE RADIO RELAY AND BROADCAST SYSTEM

Filed Aug. 8, 1945 4 Sheets-Sheet 1

WITNESSES:

Edward Michaels

James F. Young

INVENTOR

Charles E. Nobles

BY C. L. Freedman

ATTORNEY

WITNESSES:
Edward Michaels
James F. Young

INVENTOR
Charles E. Nobles
BY C. L. Freedman
ATTORNEY

AIRBORNE RADIO RELAY AND BROADCAST SYSTEM

Filed Aug. 8, 1945 4 Sheets-Sheet 3

WITNESSES:

Edward Michaels

James F. Young

INVENTOR

Charles E. Nobles.

BY C. L. Freedman

ATTORNEY

INVENTOR
Charles E. Nobles.
BY
C. L. Freedman
ATTORNEY

Patented Jan. 20, 1953 2,626,348

UNITED STATES PATENT OFFICE 2,626,348

AIRBORNE RADIO RELAY AND BROADCAST SYSTEM

Charles E. Nobles, Oaklee Village, Md., assignor to Westinghouse Electric Corporation, East Pittsburgh, Pa., a corporation of Pennsylvania Application August 8, 1945, Serial No. 609,669

12 Claims. (Cl. 250—15)

This invention relates to radio systems, and it has particular relation to radio systems employing equipment mounted on aircraft for retransmitting or relaying programs.

The term "radio" is employed to denote the radiation through space of electricity, magnetism or electromagnetic waves, variations or impulses. It is not restricted to any specific range of frequencies capable of being so radiated. For example, frequencies approaching the infrared range are being found suitable for radio purposes, and, consequently, the expression "radio" is intended to include frequencies such as those within the light spectrum.

Radio is widely employed for broadcasting "programs." These "programs" include sound or pictures of entertainment, educational, religious, advertising, or similar matter for entertainment, educational, religious or advertising purposes. Such "programs" are "broadcast" for general reception over a large area.

One of the problems involved in radio broadcasting from a single transmitting station relates to the coverage of an adequate area with a reasonable expenditure of power. If a large amount of power is required, it might entail impracticable size, weight and cost of equipment and may necessitate relatively low standards of fidelity for the station. For these reasons, the owner of a station endeavors to locate his station in a favorable location and construct his antenna in such a manner as to obtain a fairly large coverage for the available power.

Programs broadcast over radio stations are expensive to produce. For this reason, it is the practice to distribute the cost as much as possible by broadcasting the same program from a large number of transmitting stations. This may be effected by recording a program in the form of a transcription and supplying copies of the transcription to the desired transmitting stations for reproduction purposes.

Programs also are distributed to a large number of transmitting stations by means of network systems which interconnect such transmitting stations. These network systems, preferably, should be capable of connecting transmitting stations to major sources of talent for programs. For example, such sources today include Hollywood, California, and New York city. Consequently, a network system, preferably, should be capable of connecting Hollywood and New York city.

The problem of obtaining adequate coverage from one or more transmitting stations depends, in part, on the frequency of transmission employed by such station or stations. For example, at the lower frequencies employed for broadcast purposes, a program is transmitted from the antenna of the transmitting station by means of a ground wave which follows the curvature of the earth and which is capable of serving receivers distributed over a large portion of the surface of the earth. In addition, the transmitting station transmits radio waves in the form of a "sky wave" which is reflected by the Heaviside layer and returned to the surface of the earth at a substantial distance from the transmitting station. Both the ground wave and the sky wave are capable of reception by receivers which are below the horizon relative to the transmitting station.

Ultra-high frequency radio waves neither follow the curvature of the earth appreciably nor are reflected consistently from the Heaviside layer to receivers located beyond the horizon relative to the transmitting station. Consequently, to receive programs from a station employing such frequencies, the receiver must be so located that a direct line may be extended without interruption between the transmitting and receiving antennas. The art commonly refers to such transmission as "line-of-sight" transmission. For this reason, radio waves having a frequency so high that direct-line or line-of-sight reception is necessary will be referred to as direct-line or line-of-sight radio waves. The maximum range or distance between transmitting and receiving stations may be increased by raising the antennas of these stations. For this reason, it is the practice to mount such antennas on high hills, tall buildings or specially-designed towers. It should be noted further that ultra-high-frequency radiation can be reflected from reflecting surfaces, such as the surface of the earth. The reflected radiation can also reach the receiving antenna under certain conditions.

The trend in radio has steadily been toward the ultra-high frequencies or line-of-sight radio waves. For example, frequencies of the order of 100 megacycles per second recently have been proposed for frequency-modulation broadcast purposes. Even higher frequencies have been proposed for television purposes and particularly for color television purposes. For such frequencies, and with high antennas, the service radius for a typical transmitting station is of the order of 50 miles. Even for this short radius, it is difficult at present to generate the necessary power at the transmitter. For example, for high-definition color television, 50 kilowatts may be required at the transmitting station, whereas powers of the order of only 5 kilowatts are now available at frequencies contemplated for this field.

In order to provide reasonably good service for the entire country, considerable study has been given to methods and systems for connecting a large number of transmitting stations into a network. The system principally employed for sound programs involves the utilization of telephone lines for conveying the program-to-be-broadcast from its source to the various transmitting stations. Such a system is reasonably adequate for sound programs. However, the large frequency bandwidths required for certain programs, such as for television programs, and particularly for high-definition color television programs, has rendered telephone lines unsuitable for interconnecting the transmitting stations employing such bandwidths.

Considerable attention has been directed to coaxial cables for interconnecting transmitting stations. Attention has been given to a coaxial cable extending between Boston and San Francisco. Such a coaxial cable would require repeaters at frequent intervals, such as 5 miles, and would be extremely expensive to install and maintain. Furthermore, the frequency range of such coaxial cables is inadequate for high-definition color television and even for relatively low-definition, black-and-white television.

Another possible solution for the problem involves the utilization of radio-relay ground stations for conveying programs from a source to various transmitting stations. Antenna towers at each relay station may be approximately 100 to 300 feet high. Due to the line-of-sight transmission at the frequencies available for such relay stations, the stations must be placed close together, for example, approximately 35 miles apart. This means that to connect New York city to Hollywood, California, approximately 100 radio-relay ground stations must be installed. A program originating in New York city must be received and retransmitted approximately 100 times. At each of the 100 relay stations, noise, phase distortion and amplitude distortion would be introduced with a resultant substantial decrease in the quality of the program as received in Hollywood. It is clear that the cost of installation and operation of this large number of stations would be extremely high.

In both the coaxial system and the radio-relay ground station system, one or more trunk lines are contemplated across the country. Such trunk lines will serve a very small proportion of the country. Any station or stations displaced from the trunk lines must bear the cost of installing coaxial lines or relay ground stations as required. From this brief consideration, it is clear that a great amount of equipment would be required to serve the nation by means of the contemplated coaxial cable or radio-relay ground stations.

In order to avoid the foregoing difficulties, the present invention contemplates the provision of radio equipment on aircraft suitable for broadcasting and relaying any desired subject matter, such as programs. Although such equipment has advantages for low-frequency operation, it is particularly desirable for ultra-high-frequency work. It is possible to originate a program on an aircraft, but ordinarily a program may be originated on the ground and relayed to the aircraft from which it is broadcast to the ground. If desired, transcriptions of suitable subject matter, such as sound or picture programs, may be carried on an aircraft for broadcast purposes.

The advantages of an aircraft transmitting station over a good ground station operating at line-of-sight frequencies may be appreciated from a brief comparison thereof. A well-designed ground station would require, for example, 50 kilowatts to transmit a program for 50 miles, and a transmitter on an aircraft maintained at an elevation of 30,000 feet would require approximately 1 kilowatt to provide an equivalent received signal over an area on the surface of the earth having a radius of the order of 200 miles. Consequently, with $\frac{1}{50}$ of the power, the aircraft station provides four times the service distance or sixteen times the service area. The advantages of the aircraft transmitter may be summarized briefly as follows:

1. The aircraft transmitter can serve a much larger area.

2. The reduction in power requirement permits the utilization of small, lightweight and low-cost transmitters on the aircraft.

3. The small radio-frequency carrier power required for the aircraft stations is readily generated by available equipment, even for high-definition color-television programs.

4. The small power required for heating filaments, operating control circuits and supplying direct current to the plate circuits of the aircraft transmitter may be obtained from generators driven by the aircraft engines.

5. The fact that extremely high-frequencies may be employed for broadcasting from aircraft facilitates utilization of directional antennas, with their resultant gains, for both receiver and transmitter stations.

6. A single aircraft may be employed for broadcasting programs obtained from all available network systems. This means that all signals reach receivers from approximately a single direction, and the receiver may employ a fixed, directional antenna for receiving such programs. Such antennas should appreciably decrease interference and noise in all programs, and, in particular, should decrease the noticeability of "ghosts" in television reception. Briefly, a "ghost" relates to the reception in addition to a principal signal of a second signal from the same source which arrives over a path having a time of transmission different from that of the principal signal.

7. The aircraft may be maintained in continuous motion. This means that any "ghosts" at the receiver will be moving "ghosts" and these are far less objectionable than fixed ghosts.

8. Over a substantial portion of the service area, the signals from the aircraft reach the earth at a large angle of incidence. Consequently, large buildings, hills or other obstructions of the surface of the earth do not tend to shield adjacent receivers from the aircraft transmitters.

To overcome the previously-mentioned network difficulties, the invention further contemplates the utilization of radio equipment mounted on aircraft for relaying purposes. The advantages of such a system may be appreciated by a brief comparison of relay stations maintained on aircraft at a height of 30,000 feet above the ground with ground relay stations. At 30,000 feet, the line-of-sight distance between aircraft is of the order of 400 miles. This means that seven aircraft relay stations would suffice to connect Hollywood, California, and New York city. It will be recalled that 100 good radio-relay ground stations would be employed to accomplish the same connection. If desired, the aircraft may be located over oceans or other water areas. For example, a relaying connection may be established between this country and Europe. It should be clear that the great reduction in the number of relaying stations required for aircraft relay stations as compared to ground relay stations results in a great reduction in noise, amplitude distortion and phase distortion. This is particularly true of noise, which increases as a power of the number of times the program is handled. Although it is somewhat more feasible to compensate in some degree for phase and amplitude distortion, generally it is desirable to eliminate at the source, as far as possible, all such distortion.

Although the seven relay stations may handle programs originating within their service areas, spot events may be broadcast from other areas of the country. For example, a small pick-up plane containing radio equipment may be employed for relaying a desired program or event to the nearest aircraft relay station. Furthermore, the entire network is flexible and stations may be moved, added or discontinued as desired.

For relaying purpose between aircraft, any suitable frequency may be employed. However, it is preferable that an ultra-high frequency be employed. For example, if a carrier frequency of 2,000 megacycles per second is employed, and directional transmitting and receiving antennas are mounted on the aircraft, a transmitting power of approximately 1 watt suffices to relay subject matter between aircraft 400 miles apart. Electronic tubes are now available which will readily give 5 watts of power at this frequency.

It is contemplated that the aircraft radio-relay stations will be available for various services. For example, they may be employed for relaying amplitude-modulated or frequency-modulated carrier transmission of any type. In addition to the fields previously mentioned, the aircraft radio-relay stations may be employed for transmitting signals from facsimile transmitters to facsimile receivers, for relaying signals to be employed in operating business machines such as telegraph printing apparatus, for relaying telephone conversations, etc. As a typical example, an aircraft station may comprise the following equipment:

(*a*) 4 television transmitters for broadcast purposes, (*b*) 5 frequency-modulation transmitters for broadcast purposes, (*c*) Relaying equipment for any desired services including four television and 5 frequency modulation programs, (*d*) Equipment for system communication purposes, and (*e*) Monitoring equipment.

Such equipment can be mounted in an aircraft of moderate size, designed for operation at a height above the surface of the earth in excess of 10,000 feet and preferably in excess of 25,000 feet.

It will be understood that when directional antennas are employed between adjacent aircraft for relaying purposes, the transmitting and receiving antennas are maintained continually focussed on each other despite changes in the attitude of either or both of the aircraft. The angle of the beam emitted by a directional transmitting antenna may be made sufficiently large to permit substantial movement of the receiving and transmitting aircraft. For most purposes, a beam having an angle of 10° may suffice.

The height above the surface of the earth at which the aircraft station is maintained may be selected from a wide range. In general, broadcast service area and relaying distance increase, and performance improves as the height of the aircraft increases above the surface of the earth. However, it is also desirable that the aircraft be maintained at a height above the surface of the earth sufficient to escape most storms or weather disturbances, which would affect the operation of the aircraft and it is preferable that the aircraft be maintained at a height above the surface of the earth sufficient to escape substantially all storms or weather disturbances.

It is, therefore, an object of the invention to provide an improved radio broadcast system.

It is a further object of the invention to provide an improved radio relay system.

It is also an object of the invention to provide an aircraft having mounted thereon radio equipment and designed for continuous operation for substantial periods of time over a substantially fixed point on the earth's surface.

It is another object of the invention to provide an aircraft with a transmitter capable of broadcasting to the surface of the earth below and adjacent the aircraft.

It is an additional object of the invention to provide an aircraft with a radio transmitter and a radio receiver which are coupled together for the purpose of retransmitting subject matter received by the radio receiver.

It is still a further object of the invention to provide an aircraft with a radio transmitter and a radio receiver which are coupled together for the purpose of retransmitting subject matter received by the receiver and which have directional antennas directed in different directions.

Still another object of the invention is to radio-broadcast programs from an aircraft in continuous motion.

A further object of the invention comprises a method of radio-broadcasting programs from aircraft maintained at a substantial height above the surface of the earth.

It is a still further object of the invention to provide a radio broadcast system employing apparatus mounted on aircraft comprising a directional antenna which is trained on the surface of the earth below the aircraft.

It is also an object of the invention to provide a relay system employing radio apparatus mounted on aircraft.

The invention has for an additional object the provision of a radio relay system employing apparatus mounted on aircraft and the provision on each aircraft a directional antenna capable of being maintained continually in focus on the antenna of a cooperating aircraft.

Still another object of the invention comprises a radio broadcast system employing radio apparatus mounted on aircraft for relaying programs between the aircraft and for broadcasting to substantial portions of the surface of the earth such programs.

It is also an object of the invention to provide a method for radio relaying comprising maintaining aircraft relay stations at a substantial height above the surface of the earth.

It is an additional object of the invention to provide a method of radio broadcasting comprising relaying radio programs between aircraft and radio broadcasting from an aircraft to the surface of the earth.

Other objects of the invention will be apparent from the following description taken in conjunction with the accompanying drawings, in which.

Figures 1, 3:
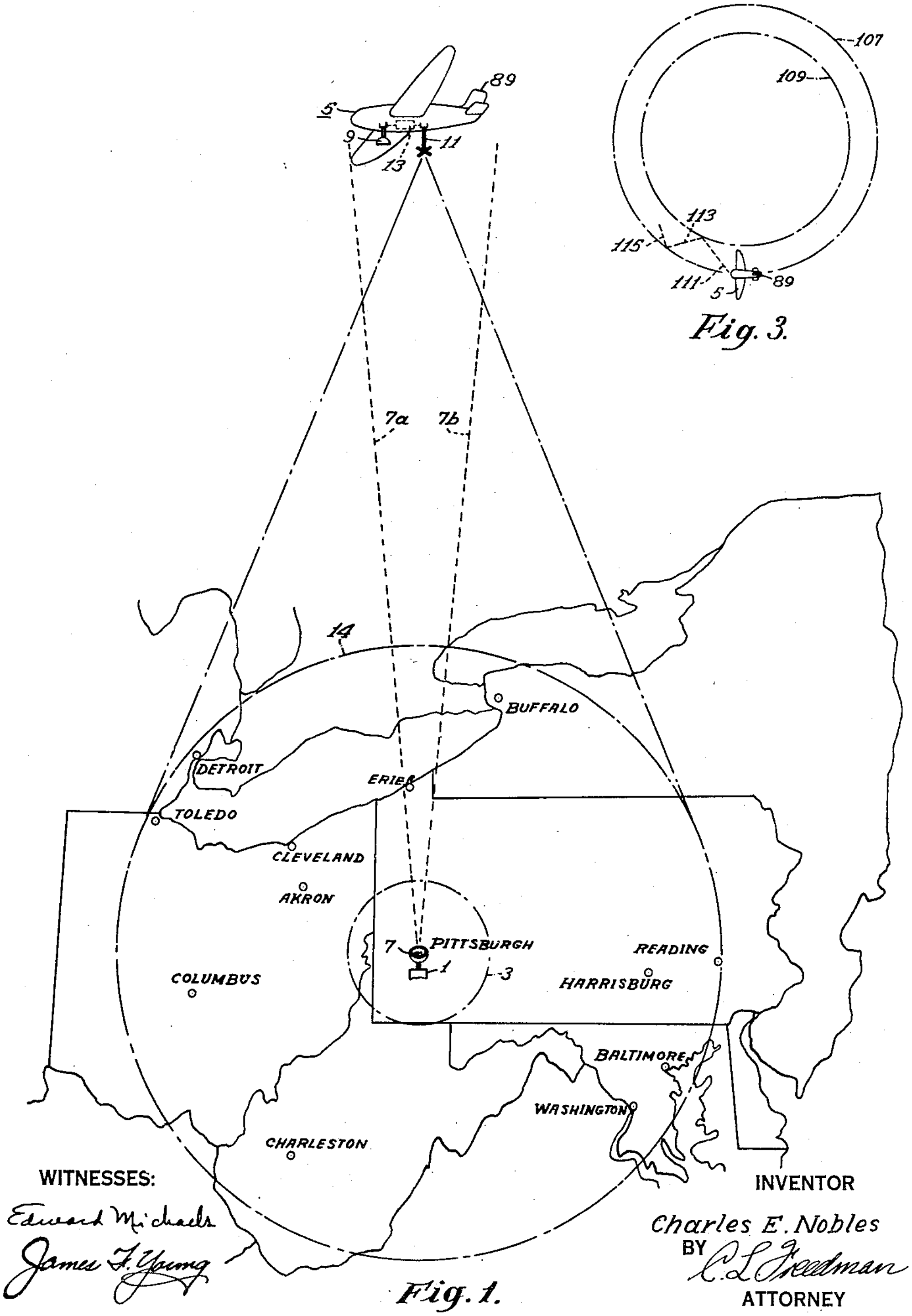
Figure 1 is a schematic representation, with parts in perspective, of a radio system embodying the invention.
Fig. 3 is a schematic representation of the cruising path of an aircraft employed as an aircraft radio station.

Referring to the drawings, Figure 1 shows a section of the United States surrounding the city of Pittsburgh. A radio station 1 is located in the city of Pittsburgh for serving the surrounding area. Assuming that the radio station is favorably located, that it broadcasts directly to the surrounding territory, that it has a power of 50 kilowatts, and that it has a high transmitting antenna, the service area of the station for line-of-sight frequencies has a radius of the order of 50 miles. This service area is represented in Fig. 1 by a circle 3.

In order to increase the service area, decrease the power required, and improve the quality of reception, an aircraft radio station represented by an aircraft 5 (shown greatly enlarged) is positioned above the city of Pittsburgh. This aircraft may be either of the lighter-than-air type or of the heavier-than-air type. It may employ any desired system of propulsion, such as propeller, jet, or rocket propulsion. Although the aircraft may be maintained substantially stationary with respect to the surface of the earth, it is preferable that it be operated in constant motion at a substantially constant height with respect to the surface of the earth. In an aircraft which has been designed for a system embodying the invention, provision is made for operating the aircraft at a cruising speed of approximately 140 miles per hour. Preferably, the speed of the aircraft is made high enough to make "ghosts" in television reasonably unobjectionable.

For operation at extreme altitudes, it is preferable that the aircraft be provided with one or more pressurized cabins, which may, for example be maintained at a pressure equivalent to that encountered at an altitude of 8,000 feet. This not only increases the comfort of personnel located in the cabin or cabins, but simplifies the design of radio equipment located therein. For example, flash over problems are less troublesome.

For example, the aircraft 34 may have its cabin 34a substantially airtight. A pump or supercharger located in one or more of the engine nacelles 34b, for example, may maintain the cabin at an air pressure higher than that of the surrounding atmosphere.

As previously explained, ghost phenomena result from reception at different times of the same transmitted signal. If a principal signal is received directly from a source, and if a fraction of a second later a replica of the signal is received for any reason, as by reflection from any object such as a hill, a building or a bridge, the replica or reflected signal appears to be an echo of the principal signal. Usually, but not always, the reflected signal is weaker than the directly-received signal.

In television, the reflected signal appears on the screen of the receiver as an echo or ghost picture which is displaced from the picture produced by the principal signal. This ghost picture confuses the observer and is objectionable. Several ghosts may be produced by signals received over different paths.

If the transmitting station is maintained in motion relative to the receiving station and/or reflection points, the ghosts also tend to move. A moving ghost is much less objectionable than a stationary ghost. Consequently, movement of the transmitter is desirable.

The transmitter may be moved with sufficient rapidity to cause the ghost to move at a rate above the following power of the observer or above the "flicker" rate. Under such conditions, the ghost appears to affect the illumination of the entire receiver screen, and has substantially the same effect on the observer as a variation in background noise or background illumination of the screen.

The aircraft is operated in a circle about a point substantially fixed with respect to the surface of the earth. The radius of the circle may vary appreciably. For example, a radius of 12.5 miles may be employed. However, a small radius tends to increase somewhat the uniformity of reception.

The aircraft may be maintained in operation for a suitable period of time. Two or more aircraft may be provided. For example, for continuous operation, one aircraft may be maintained in operation for a suitable period. Time must be allowed for the aircraft to rise to the desired altitude and to return to the surface of the earth in computing its total flying time. When the aircraft is to be removed from operation, a second aircraft is sent to the desired altitude for the purpose of taking over the radio-station functions of the first aircraft. After the second aircraft has been maintained in service for the desired period, the first aircraft may be returned to service, or a third aircraft may be placed in service, and the second aircraft may be returned to the surface of the earth. If desired, a spare aircraft may be provided as a safety factor. A spare aircraft may be maintained in the air at all times for the purpose of taking over the functions of the regular aircraft radio station in any emergency.

It should be noted that, when aircraft are employed in this manner, a high degree of mobility is obtained. For example, if an aircraft must be removed from service for overhauling, a spare aircraft may be borrowed from a similar adjacent radio station. The speed of operation of the aircraft is so great, that such spare aircraft may be obtained on short notice.

For cooperation with the aircraft 5, the ground radio station 1 is provided with an antenna 7 capable of transmitting a signal to a receiver on the aircraft 5 which comprises a receiving antenna 9. Although these antennas 7 and 9 need not be directional, it is preferable that directional antennas be provided. As well understood in the art, a directional antenna propagates or receives radiation most efficiently from a predetermined direction or directions. The utilization of directional antennas results in a decrease in power requirements and a greater freedom from interference and noise. If the radio station 1 is operated at a high carrier frequency, such as 2000 megacycles, a power of approximately one watt suffices to transmit a useful signal to the receiver on the aircraft 5. Furthermore, the location and height of the transmitting antenna 7 is of less importance than in the case of a ground radio broadcast station. It is desirable that a clear line be available between the two antennas 7 and 9.

The aircraft 5 is also provided with a transmitter which includes a transmitting antenna 11. This antenna need not be directional, but improved operation can be obtained if a directional antenna can be provided for the purpose of directing radiation toward the surface of the earth adjacent the aircraft over the desired service area. Preferably the antenna is designed to provide a field pattern such that the signal intensity over the entire service area will be as uniform as practicable. Generally, this will involve an increase in power radiated to the fringes of the service area at the expense of power radiated towards the center of the service area. The principles of directive antennas necessary to obtain the desired results are well-known in the art. The frequency of the signal radiated from the antenna 11 may be equal to, higher, or lower than the frequency of the signal received by the receiving antenna 9. For example, if the equipment is employed for transmitting frequency-modulation programs to the surface of the earth, the system may be designed to transmit a signal having a carrier frequency of 100 megacycles per second toward the surface of the earth. However, the utilization of the aircraft station permits selection of much higher frequencies for broadcast purposes. Such higher frequencies facilitate the utilization of directional antennas for transmitting and receiving stations.

The types of modulation employed for the signals received and transmitted respectively by the antennas 9 and 11 may be the same or may differ. For example, one of the signals may be amplitude-modulated, whereas the remaining signal may be frequency-modulated.

The antennas 9 and 11 are connected to each other through suitable equipment 13. If the carrier frequencies and/or types of modulation of the signals received and transmitted by the antennas differ, the equipment 13 may be designed to provide the desired change in frequency and/or modulation, as well as the required amplification of the signal. For example, the equipment 13 may be designed to demodulate the signal received from the antenna 9 and may include a transmitter which is modulated by means of the demodulated signal derived from the antenna 9. If the antennas 9 and 11 are operated at the same frequency, the equipment 13 may include an amplifier for amplifying the signal received from the receiver antenna 9 to a level suitable for radiation from the antenna 11. Generally, it is desirable to operate the antennas 9 and 11 at different carrier frequencies.

It has been found that the power required for transmission from the antenna 11 may be much smaller than that required for transmission from a ground transmitting station.

Figures 2, 4:
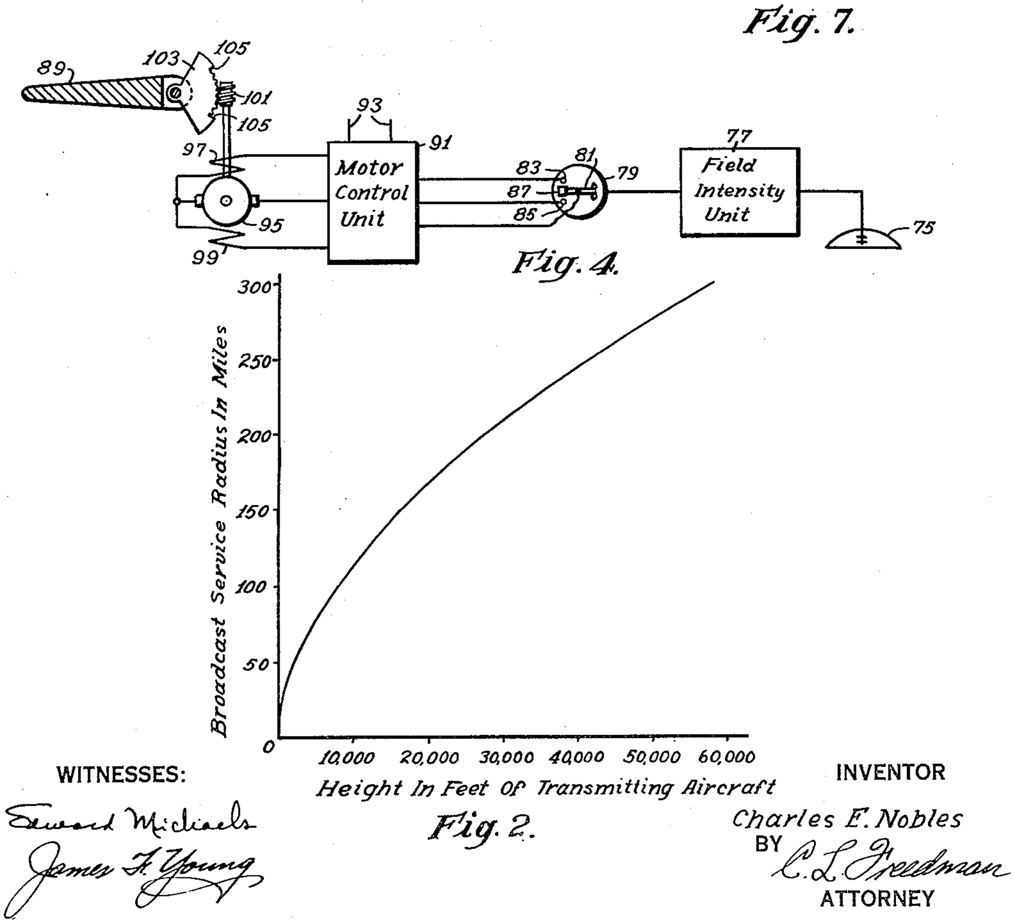
Fig. 2 is a graphical representation showing the relationship between the height of an aircraft transmitting station and the service radius of the station.
Fig. 4 is a schematic representation of a navigating system suitable for an aircraft radio station.

The height at which the aircraft 5 operates may be selected as desired from a substantial range. Assuming a spherical earth, the relationship between the height and service area is shown in Fig. 2, wherein abscissae represent the height of the aircraft above the surface of the earth and ordinates represent the radius of the service area covered by a transmitting antenna mounted on the aircraft. For example, the aircraft may be maintained at a height above the surface of the earth which is of the order of 10,000 feet or more.

The advantages herein discussed for aircraft radio broadcasting and relay increase as the height of the aircraft above the surface of the earth increases. This increase may not be linear. On this basis, the height at which the aircraft are maintained may be selected from a wide range. However, certain additional factors merit consideration.

It is found that certain ranges of heights above the surface of the earth may be selected which are free of most weather disturbances or which are free of substantially all weather disturbances. Although the aircraft may be maintained advantageously in the troposphere, desirably at heights above most weather disturbances, preferably the aircraft are positioned in the stratosphere which is substantially free of all weather disturbances.

The height at which the stratosphere begins appears to vary with latitude and with the season. In general, the region substantially free of storms begins about 25,000 to 30,000 feet above the surface of the earth. In a system under development for the United States, operation of aircraft at a height selected from the range between 30,000 feet and 40,000 feet above the surface of the earth is contemplated, with a possible subsequent increase in operating height above 40,000 feet. When operated at a height of 30,000 feet, the transmitting antenna at line-of-sight frequencies will cover a service area having a radius of approximately 200 miles with a power of one kilowatt. The circumference of such a service area is shown in Fig. 1 by a circle 14.

If frequencies of transmission are employed at which the signal transmitted is affected by discontinuities in the atmosphere an additional advantage is gained by operation of an aircraft radio station at a substantial height. For example, if a signal is subject to reflection from storm fronts, operation of the aircraft radio station at heights well above the region subject to storms decreases the proportion of the signal path which must pass through the storm-subject region. This should be considered also in connection with the utilization of aircraft radio stations for relaying purposes.

The exceptional decrease in the ratio of signal power to service area resulting from the substitution of aircraft for ground radio stations should be noted. The reasons for the decrease are not essential for an understanding of the invention. However, it may be pointed out that if signals arrive at a receiver station from a common transmitter station over different paths, the signals may arrive substantially in phase opposition. Such paths may be, for example, a first path extending directly between transmitter and receiver stations, and a second path wherein a signal from the same transmitter station is reflected to the same receiver station from some reflecting object such as a hill, a building or a bridge. If the reflection changes the phase of the incident signal by 180° and the two paths are substantially equal in length, the direct and reflected signals may be substantially in phase opposition at the receiver station. Consequently, the resultant signal may be very small.

By employing an aircraft transmitter station located at a substantial height above the surface of the earth, the utilization of directional receiver antennas capable of discriminating against reflected signals is facilitated. Moreover, the differences in lengths of the two paths may be made sufficient to bring the two signals into an aiding phase relationship rather than an opposed phase relationship.

The aircraft 5 may be provided with several directional transmitting antennas each designed to cover a small portion of the total service area for the aircraft. For example, if it is desired to transmit a program from the aircraft 5 which is designed for the city of Erie, Pennsylvania, alone, a directional antenna may be proportioned and directed to confine its radiation to an area on the surface of the earth corresponding as closely as possible to that occupied by the city of Erie. For the purpose of discussion, it will be assumed that the antenna 11 is designed to direct radiation to a service area having Pittsburgh as its center, and represented by the circle 13.

The aircraft 5 may have a set of receiving and transmitting antennas together with associated equipment for each program to be simultaneously broadcast to the associated service area. However, ordinarily the carrier frequencies of the different programs will be in a range permitting use of a single antenna for this purpose. Since all of the programs come from the same aircraft, directional receiving antennas may be employed on the surface of the earth. These antennas may be directed permanently for reception from the aircraft 5. The utilization of directional receiving antennas results in a further reduction in interference and noise at each receiver, and an increase in efficiency of operation of each receiver.

As previously pointed out, the provision of aircraft stations similar to that represented by the aircraft 5 makes practicable the utilization of carrier frequencies much higher than those customarily employed in the prior art for broadcast purposes. This not only expands the useful broadcast spectrum, but it facilitates employment of directional transmitting and receiving antennas with their inherent gain and selectivity.

Furthermore, it should be noted that radiation from the aircraft 5 is directed downward from such altitude that the angle of incidence at the surface of the earth is extremely large. Consequently, high buildings and other protuberances on the surface of the earth do not tend to shield receivers mounted on adjacent low structures from the transmitting antenna. As a matter of fact, shadows offered by such protuberances to the radiation do not extend substantially from the areas of the protuberances projected on the surface of the earth for a substantial portion of the service area. This facilitates shadow-free coverage of a greatly increased service area by the aircraft. Furthermore, the large angle of incidence together with the utilization of directional receiving antennas assist in eliminating unwanted interference, such as reflections from objects such as buildings, bridges and hills over a substantial portion of the service area. Consequently, the invention provides ghost-free reception to an extent much greater than that available in the prior art.

An aircraft radio station may be maintained over a predetermined point on the surface of the earth in any suitable manner. If desired, a pilot may be employed on each aircraft for the purpose of maintaining the desired location thereof. However, in most cases, it is preferable to provide a suitable automatic device for maintaining the aircraft properly located. For this reason, a representative automatic device for maintaining the location of an aircraft radio station will be briefly described.

Referring to Fig. 1, it will be noted that the ground station antenna 7 directs radiation substantially vertically upwards from the city of Pittsburgh. The beam produced by the antenna 7 is represented as lying between dotted lines 7*a* and 7*b*. The angle of the beam should be sufficient to provide adequate signal intensity for all locations of the aircraft 5 during its operation as an aircraft radio station.

It will be understood that the maximum signal intensity is obtained along the axis of the beam radiated from the antenna 7. This axis is intermediate the dotted lines 7*a* and 7*b*. The intensity decreases as a function of the displacement of the observation point from the aforesaid axis of the beam. This variation in field intensity may be employed for controlling the aircraft 5. A system suitable for this purpose is illustrated in Fig. 4.

Referring to Fig. 4, it will be observed that an antenna 75 is coupled through a field-intensity unit 77 to a field-intensity meter 79 having a pointer 81. The unit 77 may include amplifiers and any other equipment necessary for operating the field-intensity meter 79. The antenna 9 of Fig. 1 may be employed as the antenna 75 of Fig. 4, or a separate antenna may be employed if desired. If the antenna 9 is employed, it will be understood that a portion of the radiation received by the antenna will be employed for operating the field-intensity meter.

The field-intensity meter 79 is provided with a pair of contacts 83 and 85 located on opposite sides of a contact 87 carried by the pointer 81.

Let it be assumed that the aircraft 5, on which the field-intensity meter 79 is located, is circling above the city of Pittsburgh at a position with respect to the radiated beam from the antenna 7 of Fig. 1, such that the pointer 81 of the field-intensity meter occupies the position illustrated in Fig. 4. If the aircraft approaches the axis of the beam, the pointer of the field-intensity meter moves in such a direction as to engage the contacts 83 and 87. On the other hand, if the aircraft moves away from the axis of the beam, the field strength decreases, and the pointer moves in such a direction as to establish engagement between the contacts 85 and 87. Consequently, the engagement of the contacts 83 and 85 by the contact 87 may be employed for the purpose of controlling the rudder 89 of the aircraft. It will be understood that the contacts 83 and 85 may be positioned as desired, to engage the movable contact 87 at desired field intensities. The position of the pointer 81 indicates to the aircraft pilot the position of the aircraft with respect to the radiation field.

The contacts of the field-intensity meter 79 are connected to a suitable motor control unit 91 which is energized from a suitable source of electric current represented by conductors 93. The motor-control unit contains equipment such as relays for the purpose of controlling the direction of rotation of a reversible direct-current motor 95 in accordance with the engagement of the stationary contacts 83 and 85 by the movable contact 87. For example, if the contacts 83 and 87 engage, the field winding 97 of the motor 95 is energized to produce rotation of the motor 95 in a first direction. On the other hand, if the contacts 85 and 87 are in engagement, the field winding 99 of the motor 95 is energized to produce rotation of the motor in an opposite direction. The motor 95 is coupled to the rudder 89 through a worm gear 101 and quadrant gear 103. Consequently, rotation of the motor 95 controls the position of the rudder. If desired, stops 105 may be provided for limiting the angular movement of the rudder. It will be understood that the coupling between the motor 95 and the rudder 89 may be interrupted as by separating gears 101 and 103 to permit the aircraft pilot to control manually, or otherwise, the rudder 89.

The operation of the system illustrated in Fig. 4 may be understood by reference to Fig. 3, which corresponds to a cross-section through the beam represented by the dotted lines 7a and 7b of Fig. 1. Let it be assumed that the circle 107 of Fig. 3 represents a field intensity such that the contacts 85 and 87 of the field-intensity meter 79, shown in Fig. 4, are in engagement. Let it be assumed further that the circle 109 represents a stronger field intensity such that, if the aircraft 5 is located on the circle 109, the contacts 83 and 87 of the field-intensity meter 79 are in engagement. If the aircraft 5 is flying in a circle in a clockwise direction, as viewed in Fig. 3, and if the aircraft 5 reaches a position on the circle 107, the contacts 85 and 87 engage to rotate the rudder 89 of the aircraft in such a direction as to cause the aircraft to follow the line 111. The aircraft follows the line 111 until it intercepts the circle 109. At this point, the field intensity has increased sufficiently for the contacts 83 and 87 of the field-intensity meter to engage each other. Such engagement results in rotation of the rudder 89 to direct the aircraft along a line 113. When the aircraft reaches the circle 107, the field-intensity meter again initiates a rotation of the rudder 89 to cause the aircraft to follow a line 115.

This cycle is repeated for as long a period as desired to cause the aircraft 5 to fly in a generally circular path above the city of Pittsburgh. It will be understood that the aircraft, in effect, follows in an irregular path located between the circles 107 and 109 of Fig. 3. The angle through which the rudder is rotated by the motor is sufficient to permit the aircraft to travel from one to the other of the circles 107 and 109 after each such rotation.

Figure 5:
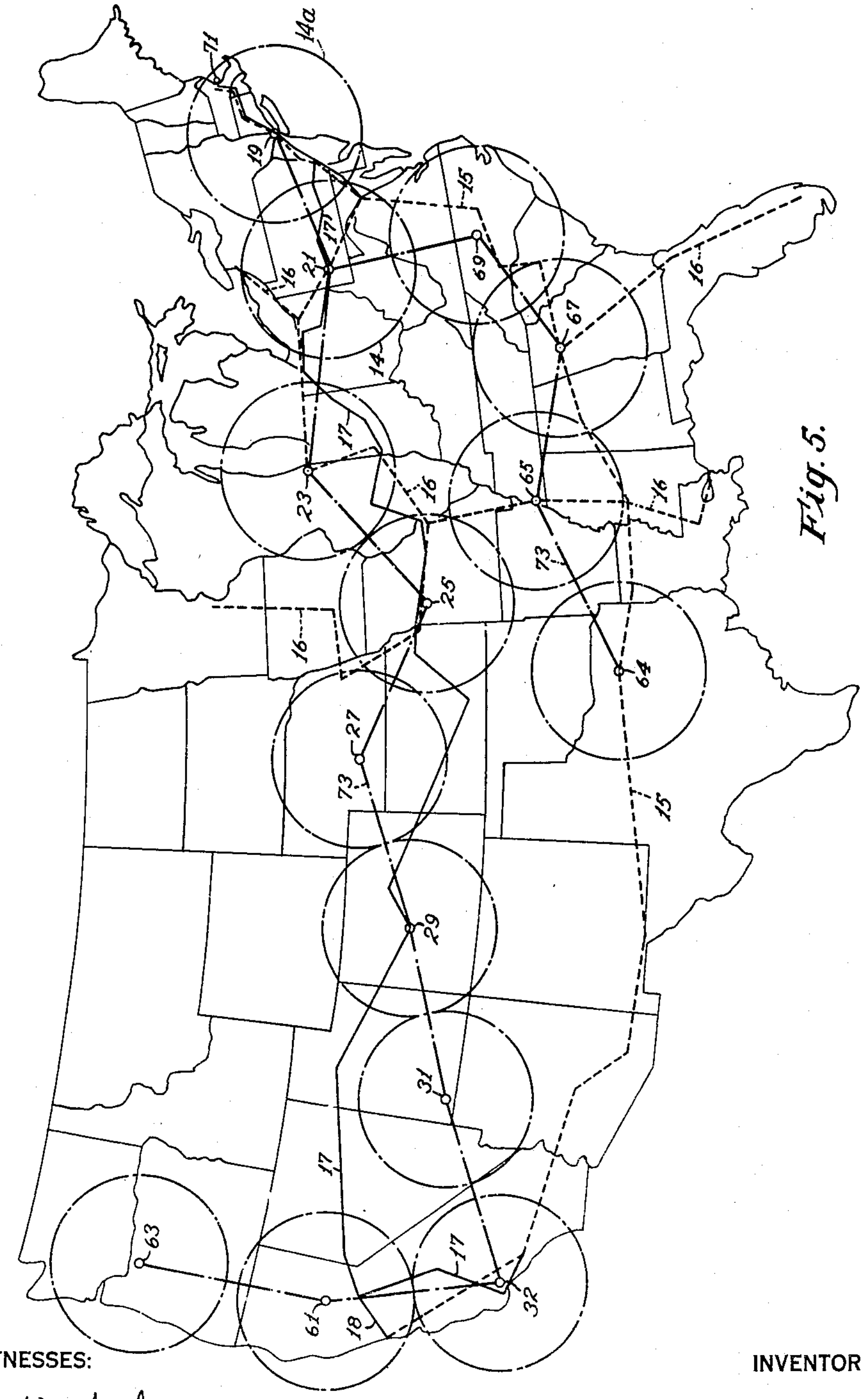
Fig. 5 is a geographical representation showing network systems extending over the United States.

Turning now to the problem of covering a substantial portion of the surface of the earth with a network system, reference may be made to the map of the United States shown in Fig. 5. When reference is made to the surface of the earth, it is understood that both land and water surfaces are included.

As previously explained, it has been proposed to provide the interconnection required for network purposes by means of coaxial cable. The coaxial cable system is illustrated in Fig. 5 by means of a dotted line 15. Such a coaxial cable requires repeaters at short intervals such as five miles and is expensive to install and maintain. Since the service area of a ground transmitting station operating at the higher frequencies has a radius of the order of 50 miles, if the line 15 is assumed to have a width of 100 miles, it represents the limits of reception from a series of transmitting stations which are located at intervals of approximately 100 miles along the entire line. Despite the large number of transmitting stations thus required, the proportion of the country within the service area of these stations is extremely small. If it is desired to serve areas of the country appreciably displaced from the line 15, it would be necessary to install and maintain additional coaxial lines 16 for such areas.

An alternative previously mentioned is the provision of a plurality of ground-relay stations extending across the country. A proposed line of relay stations is represented in Fig. 5 by a line 17. As previously explained, ground-relay stations would be required along the line 17 at intervals of approximately 35 miles. This means that approximately one hundred ground-relay stations would be required between New York city and Hollywood, California, with attendant high cost of installation and operation. Moreover, the extensive number of stations would result in severe noise and distortion problems.

If ground transmitting stations were located along the line 17, at intervals of 100 miles, a small area of the country along the line 17 would be within the service areas of these stations. The resultant service area would not be appreciably greater than the area represented by assuming that the line 17 is 100 miles wide. For this reason, the contemplated installation of relay stations would serve a very small portion of the area of the United States. If areas more than 50 miles from the line 17 of relay stations desired service, an additional line 18 of relay stations must be installed for each such area.

In accordance with the invention, aircraft relay stations are provided. As shown in Fig. 5, aircraft relay stations, 19, 21, 23, 25, 27, 29, 31 and 32, would be employed for connecting New York city and Hollywood, California. Each of these aircraft relay stations may be substantially similar to the aircraft station 5 illustrated in Fig. 1.

Figure 6:
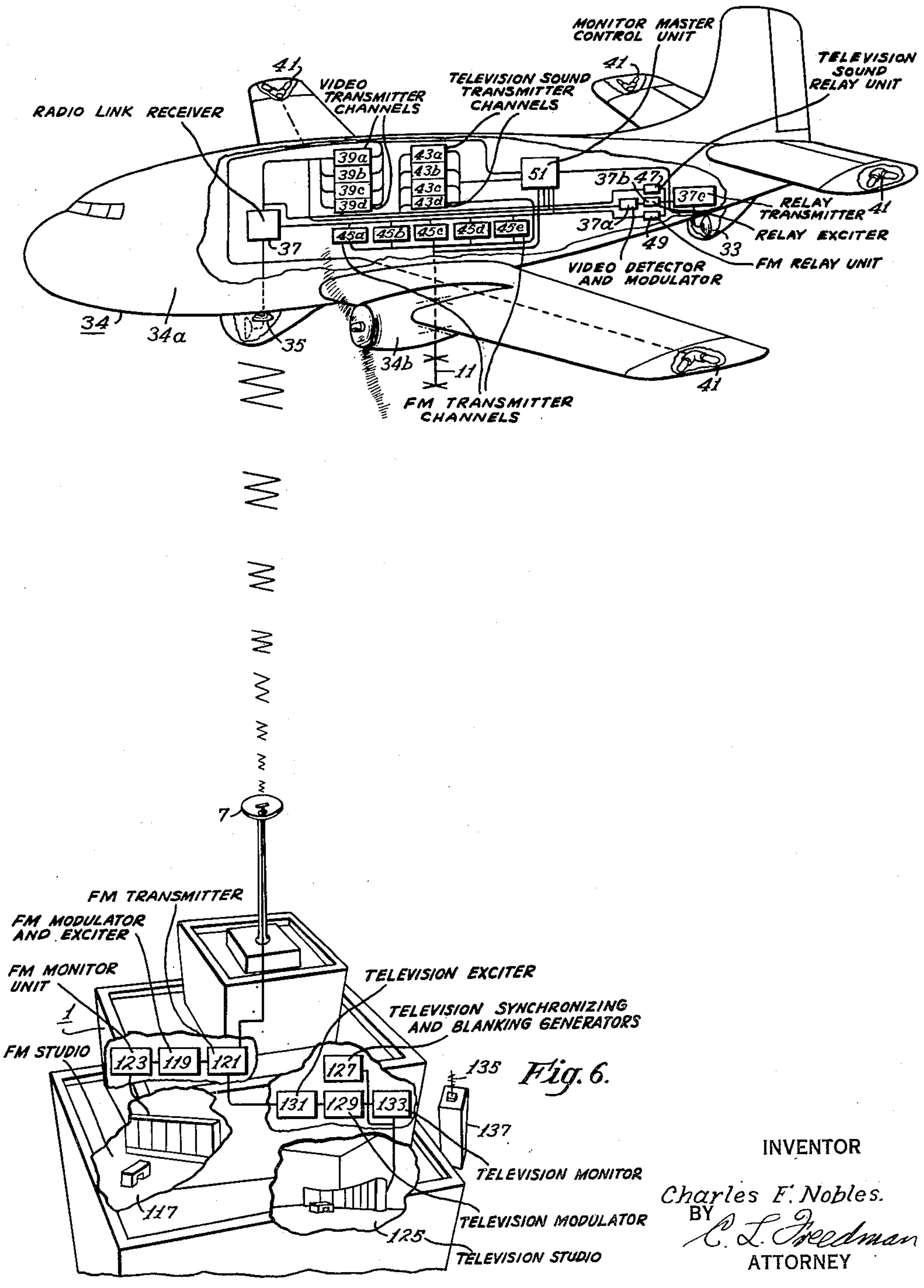
Fig. 6 is a schematic representation with parts in perspective and parts broken away of an aircraft radio system embodying the invention.

A suitable aircraft, or more fully an aircraft radio station, 34, is shown on a larger scale in Fig. 6. If desired, a standard aircraft radio station may be provided for all locations, and the proper antennas and associated radio equipment selected, connected and adjusted to perform the necessary functions. Referring to Fig. 6, it will be observed that the aircraft 34 is provided with an antenna 33 for the purpose of transmitting a signal-to-be-relayed to another one of the aircraft relay stations. In addition, the aircraft 34 is provided with a receiving antenna 35 for receiving a signal from the preceding aircraft in the relay chain. For such reception, the antenna 35 occupies the position indicated in dotted lines. These antennas may be omni-directional; but, preferably, they are directional for the purpose of reducing noise and interference and for the further purpose of conserving energy. The angle of the beam projected by the transmitting antenna 33 may be sufficiently large (for example, 10°) to permit a reasonable amount of maneuvering by the aircraft illustrated and by the succeeding and preceding aircraft in the relay chain. If the program originates at the ground radio station 1 below the aircraft 34, the antenna 35 may be directed downwardly, as shown in full lines, to receive the desired program from the local ground station.

The antennas 33 and 35 may be connected together through suitable equipment. For example, this equipment may comprise a ground-link or relay-link receiver 37 designed to handle the video and sound signals of a television program and the sound signals of independent frequency-modulation sound programs. The receiver 37 supplies the video signal on a radio-frequency carrier to a video detector and modulator 37*a*. The output of the detector and modulator 37*a* is coupled to a video relay exciter 37*b* which supplies a video-modulated carrier signal to a relay-link transmitter or amplifier 37*c* for transmission from the relay-link antenna 33. The antennas 33 and 35 may be operated on the same or on different carrier frequencies.

As shown in Fig. 6, the ground-link or relay-link receiver 37 also provides video-modulated carrier signals for four television programs derived from the antenna 35 to four television video transmitter channels 39*a*, 39*b*, 39*c* and 39*d*. Each of these channels amplifies one of the signals at a suitable carrier frequency and the amplified signal is then transmitted to the earth over one or more television transmitting antennas 41 which are mounted in the tips of the wing and tail structures.

If carriers of very high frequency are employed, so that each program occupies a bandwidth which is a very small percentage of the carrier frequency, all programs may be received and transmitted over a common receiving antenna and a common transmitting antenna. Also a single channel, such as the channel 39*a*, may then suffice to handle all programs. When four separate channels are shown, each may be connected to a separate television antenna 41 or to a combination of antennas as desired. The antennas may be located within airfoil domes of plastic, wood, or other material permitting transmission of radiation therethrough.

The ground-link or relay-link receiver 37 may also supply at audio frequencies the sound signal which is to accompany the video programs to four television sound transmitter channels 43*a*, 43*b*, 43*c* and 43*d*. Each of these channels modulates a suitable carrier by one of the audio sound signals and amplifies the modulated carrier for transmission to the earth from the antenna 11. Here again, if the carrier frequencies are sufficiently high, it is practicable to handle all of the sound programs by means of only one of the transmitter channels, such as the channel 43*a*. In such a case, the remaining channels 43*b*, 43*c* and 43*d* need not be employed.

For frequency-modulation sound programs, the ground-link or relay-link receiver 37 may receive five such programs via the antenna 35 and supply such programs at audio frequencies to five frequency-modulation transmitting channels 45*a*, 45*b*, 45*c*, 45*d* and 45*e*. Each of the channels may be employed for modulating a suitable carrier and amplifying the resultant signal for transmission from the antenna 11. If suitably high carrier frequencies are employed, it is practicable to employ a single channel, such as the channel 45*a*, for all of the five sound programs.

The ground-link or relay-link receiver 37 additionally supplies at audio frequencies the sound programs which accompany the video programs to a suitable sound relay unit 47 which, in conjunction with the transmitter 37*c*, produces a modulated and amplified high-frequency carrier signal for transmission from the antenna 33. Similarly, a frequency-modulation unit 49, in conjunction with the transmitter 37*c* is supplied with audio frequency-modulation program signals from the receiver 37 to produce a modulated and amplified, high-frequency carrier signal for transmission from the antenna 33.

It will be understood that the receiver 37 includes amplifiers, detectors, modulators and other equipment as required to provide the outputs herein referred to.

It will be understood further that duplicate equipment or additional equipment of any type maye be provided as desired to care for the services to be performed by the aircraft station. The radio components required are well-known in the art and a more detailed description of suitable transmitting and receiving equipment is believed to be unnecessary.

All of the receivers, transmitters, channels on the aircraft radio station may be connected to a suitable monitor and master-control unit 51. This unit may be employed for controlling the station equipment in a manner well understood in the art.

The ground radio station 1 may be of any suitable design capable of directing the desired radiation toward the antenna 35 of the aircraft 34. As shown in Fig. 6, the station 1 includes a frequency-modulation sound studio 117 having a suitable frequency-modulation transmitter located therein. As shown by the block diagram, the frequency modulation equipment includes a frequency-modulation, ground-link modulator and exciter 119 which is followed by the ground-link transmitter or amplifier 121. The modulated carrier output of the ground-link transmitter is supplied to the antenna 7 for radiation to the aircraft 34. The various units of the frequency modulation equipment are connected to a frequency modulation monitor unit 123 for the purpose of facilitating control of the operation of the frequency modulation studio.

In addition, the station 1 inculdes a television studio 125. As shown in the block diagram, the television studio equipment includes suitable synchronizing and blanking generators 127 for the television equipment, a modulator unit 129 and a television ground-link exciter 131. The output of the exciter may be amplified in the transmitter or amplifier 121 prior to radiation from the antenna 7. The various units of the television studio equipment are connected to a television monitor unit 133 for facilitating control of the equipment. The modulated-carrier output of the television studio equipment is supplied to the antenna 7 for radiation to the aircraft 34.

From the preceding discussion, it will be understood that the station 1 transmits to the aircraft desired sound and television programs. These programs may be retransmitted, or broadcast, from the aircraft to suitable receivers on the surface of the earth, such as that represented by the antenna 135 located on a building 137. In addition, the aircraft 34 may be employed for relaying the various programs to other aircraft radio stations.

It is to be understood that any one of the aircraft in a relay chain may receive a program from a ground station which is to be relayed to other aircraft relay stations. For example, in Fig. 6, the ground radio transmitter 1 may be employed for transmitting a program for reception by the receiving antenna 35 which would be in its full-line position. This receiving antenna may be connected through the equipment 37 and associated equipment to the transmitting antenna 33 for the purpose of retransmitting the program to the succeeding aircraft in the relay chain. If the aircraft 34 is an intermediate station in the chain, the equipment 37 also may be connected to other antennas to transmit the program to other aircraft relay stations. It is to be understood that as many antennas may be employed as required to serve adjacent aircraft relay stations.

From the foregoing discussion, it will be apparent that each aircraft in the radio relay chain may be employed for receiving a program originating on the ground, for retransmitting the program to the surface of the earth adjacent the aircraft, for relaying the program to another aircraft in the chain, for relaying programs received from preceding aircraft in the relay chain, and for broadcasting programs relayed from preceding aircraft in the relay chain. Preferably, each aircraft is designed to provide equipment for relaying several separate network programs and for transmitting several separate programs simultaneously to the portion of the surface of the earth adjacent the aircraft. As previously pointed out, each of the aircraft in the relay chain may be similar to the aircraft 34. If the aircraft 34 of Fig. 6 is employed for relaying a first program received from another aircraft radio station, and for broadcasting simultaneously a locally-produced second program, a first receiving antenna similar to the antenna 35 (in its dotted-line position) may be connected to the antenna 33 for relaying a first program. In addition, a second receiving antenna similar to the antenna 35 (in its full-line position) may be positioned to receive a locally-produced second program from a ground station, similar to the station 1 of Fig. 6. This second antenna is connected to the antenna 11 through the equipment 37 and associated equipment for simultaneously broadcasting the second program.

Although only a single line of aircraft relay stations has been discussed with reference to Fig. 5, it is to be understood that the relay system may be expanded readily as desired. Since the major portion of the equipment is mounted on aircraft, a station may be readily discontinued or moved to a different location. To illustrate the facility with which the relay system may be expanded, Fig. 5 shows extensions of the relay chain employing aircraft radio stations 61 and 63 to serve areas in Oregon and Washington, and aircraft stations 64, 65, 67 and 69 to serve areas in the southern States.

If it is desired to broadcast a program originating at a point displaced from the relay chain, one or more additional pick-up aircraft may be employed to convey the desired program to the nearest aircraft relay station. This is represented in Fig. 5 by a pick-up aircraft 71 which has been sent up over Boston to pick up a program from a ground radio station located in Boston. The pickup aircraft relays the program to the aircraft station 19 over New York city and, from this point, the relay chain operates in its normal manner to delives the program to a substantial portion of the United States.

The pick-up aircraft 71 may include a television camera and associated equipment for originating signals depicting aerial views of flood conditions, sports events and other suitable material. These signals may be transmitted to the relay chain from the pick-up aircraft for distribution over the entire chain.

A portable ground radio station may be provided which can be transported rapidly by truck, railroad or aircraft to a desired ground location. When properly set up, this ground station can transmit by radio locally-produced programs to a pick-up aircraft positioned thereabove. In turn, the pick-up aircraft relays by radio the programs to the nearest aircraft radio station of the relay chain.

If the dot-dash line 73 connecting the aircraft stations between New York city and Hollywood is assumed to be 400 miles wide, the resulting area represents the approximate service area for the aircraft. Consequently, it will be appreciated that, despite the material reduction in relay stations, in broadcast stations, and in power consumption, a substantial increase in service area is obtained. Moreover, since a program is relayed a much smaller number of times by the aircraft relay stations, a substantial improvement in the quality of the program is obtained. It will be understood that each of the aircraft in the relay chain may be operated at a height above the surface of the earth, which may be of the order of 30,000 feet. As previously explained, such a height permits a 400 mile spacing of the relay aircraft, and permits each of the aircraft to serve an area having a radius of about 200 miles on the surface of the earth adjacent the associated aircraft.

It will be recalled that one aircraft in a relay chain may have a directional transmitting antenna which is focused on a succeeding aircraft in the relay chain. Since each of the aircraft is subject to changes in attitude, it is desirable that the transmitting antenna be maintained directed on the associated receiving antenna of the succeeding aircraft despite changes in attitude of the two aircraft. Although it is possible to maintain the antenna properly directed by means of manually-operated controls, it is desirable that automatic mechanism be provided for this purpose. To this end, compass-controlled or gyroscopically-controlled supports for the antennas may be provided.

If the aircraft 34 flies in a small circle about a point fixed with respect to the earth, all antennas may be mounted on a single, stabilized platform which is maintained properly directed by suitable compass or gyroscopic controls. However, if the aircraft flies in a large circle, it may be preferable to mount certain of the antennas on separate, stabilized and properly-directed platforms. The problem of maintaining an antenna properly oriented or directed is simplified by operaton of the aircraft at higher altitudes, such as at the 30,000 foot height above the surface of the earth, for the reason that flying conditions are more stable at such altitudes.

If omni-directional antennas are employed for the aircraft radio stations, orientations of the antennas are not required. However, if directional antennas are employed, cooperation antennas should be maintained in focus on each other. Although orientations of the antennas may be effected manually, it is preferable that equipment be provided for automatically maintaining the desired orientation. Such equipment will be discussed with reference to Fig. 7.

Figure 7:
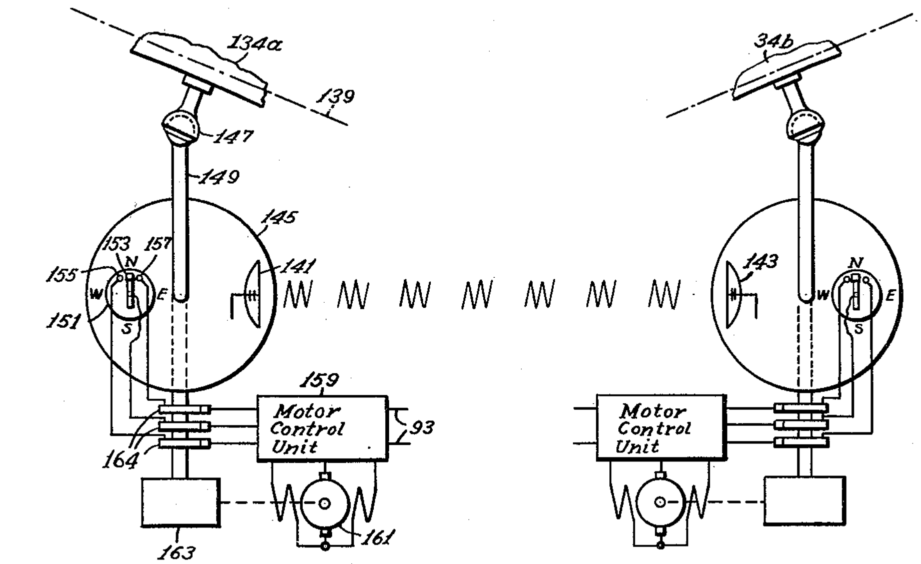
Fig. 7 is a schematic representation of an antenna orienting system suitable for the invention.

In Fig. 7, a portion of an aircraft 134a is shown which corresponds to the aircraft 34 of Fig. 6. Since the aircraft is maintained in operation around a generally circular path, the bank of the aircraft is represented by a line 139 which is drawn through the wings of the aircraft. If the circle about which the aircraft operates is large, and if the changes in direction of the aircraft necessary to maintain it properly located are small, the angle of bank is small and reasonably constant. This is particularly true for operation in the stratosphere where flying conditions are extremely stable.

The aircraft 134*a* is provided with an antenna 141 which is to be maintained in focus on an antenna 143 of a second aircraft radio station mounted on an aircraft 134*b*. The antenna 141 may be mounted on a suitable platform 145.

As previously pointed out, if the aircraft is operated in the stratosphere, flying conditions are stable and, except for its rotation about a substantially fixed point with reference to the earth, the attitude of the aircraft remains substantially fixed. However, if the attitude of the aircraft is subject to a change as by operation at low heights above the surface of the earth, the platform 145 may be stabilized by suitable gyroscopic devices to maintain a horizontal position at all times.

The platform 145 may be adjustably mounted on the aircraft 134*a* in any suitable manner as by means of a universal joint 147 which permits the axis of the platform, as represented by the shaft 149, to be adjusted along a line passing through the center of the earth. If the aircraft 134*a* flies substantially uniformly about a substantially circular path, the shaft 149 remains reasonably vertical at all times. Consequently, stabilizing devices for maintaining the vertical position of the shaft are unnecessary for this condition of operation.

In order to maintain the antenna 141 properly focused despite the operation of the aircraft about a circular path, the platform 145 is mounted for rotation about the axis of the shaft 149. This rotation is controlled by a contact-making compass 151 mounted on the platform and having a movable contact 153 which can engage either of two contacts 155 or 157 depending on the direction of deviation of the position of the compass from a predetermined position. For example, if the platform 145 were to move in a clockwise direction, as viewed in Fig. 7, the contacts 153 and 155 would engage. On the other hand, if the platform 145 were to move in a counterclockwise direction from the position illustrated in Fig. 7, the contacts 153 and 157 would engage. The contacts are connected through a motor-control unit 159 to a reversible direct-current motor 161. The motor-control unit and reversible motor may be similar, respectively, to the motor-control unit 91 and the motor 95 of Fig. 4. The motor 161 is connected through a suitable flexible shaft and gearing 163 to the platform 145, for controlling the angular position of the platform about the shaft 149. The connections are such that, if the platform changes its direction with respect to the earth, the contact-making compass 151 energizes the motor 161 to restore the proper orientation of the platform 145. Consequently, the antenna 141 mounted on the platform 145 may be maintained continuously directed along a predetermined direction. In a similar manner, the antenna 143 may be maintained continuously directed toward the antenna 141. Electrical connections from equipment mounted on the platform 145 to equipment which does not move with the platform may be made through slip rings 164.

The system having been described in detail, the operation thereof will now be set forth. Let it be assumed that a program originates at a ground radio station in New York city. This program will be transmitted from the ground station by radio at a substantial frequency, such as 2000 megacycles per second, to the aircraft radio station 19 (Fig. 5) flying above New York city at a height of the order of 30,000 feet. Referring briefly to Fig. 6, this corresponds to transmission from the antenna 7 to the antenna 35 of the aircraft 34.

If desired, the aircraft radio station 19 may retransmit, or broadcast, the program to New York city and the areas surrounding New York city. The area which is covered by a broadcast from the aircraft radio station is represented in Fig. 5 by the circle 14*a*. It will be understood that, for this broadcast, the aircraft radio station 19 will employ an antenna corresponding to the antenna 11 of Fig. 6 for sound programs, and antennas corresponding to the antennas 41 for television programs. It will be understood that suitable equipment is always provided between the receiving antenna 35 and the various antennas 11 and 41 of the aircraft radio station. This equipment may be designed to retransmit the program on the same carrier employed by the ground station, or on a different carrier. If the ground station employs frequency modulation, the aircraft radio station may transmit the program by frequency-modulation, or may transform the signal into a differently-modulated signal, such as an amplitude-modulated signal. Radio equipment for transforming signals in this manner is well-known in the art.

Referring again to Fig. 5, the program may be retransmitted or relayed from the aircraft radio station 19 to an aircraft radio station 21 flying above the city of Pittsburgh, at a height of the order of 30,000 feet. For this purpose, the aircraft radio station 19 employs a transmitting antenna similar to the transmitting antenna 33 of Fig. 6.

The desired program, or programs, are received by the aircraft radio station 21 on an antenna corresponding to the antenna 35 of Fig. 6, which occupies its dotted-line position. The aircraft radio station 21, in turn, may transmit or broadcast the program, or programs, to the city of Pittsburgh and the surrounding area denoted by the circle 14 from antennas corresponding to the antennas 11 and 41 of Fig. 6. In addition, the aircraft radio station 21 may retransmit or relay the program, or programs, to aircraft radio stations 23 and 69 which are positioned appoximately 30,000 feet above points in the United States of the order of 400 miles from the city of Pittsburgh. In this manner, the program, or programs, are relayed and/or broadcast by the various aircraft radio stations connected by the dot-dash line 73. For example, from the aircraft radio station 23, the program or programs, are relayed successively through the aircraft radio stations 25, 27, 29, 31 and 32, to Hollywood, California, and the area surrounding Hollywood. In each case, a dot-dash circle surrounding the aircraft radio station denotes the area which may be covered by a broadcast from the aircraft radio station to the surface of the earth adjacent the aircraft radio station.

From the aircraft radio station 32, the program, or programs, may be broadcast to Hollywood and the area surrounding Hollywood, and, in addition, may be relayed to the aircraft radio stations 61 and 63.

Returning to the aircraft radio station 69, it will be observed that the program, or programs, reaching this station may be relayed successively to the aircraft radio stations 67, 65, and 64. As previously pointed out, each of the aircraft relay stations is positioned at a height above the surface of the earth of the order of 30,000 feet and may broadcast the program, or programs, to the surface of the earth adjacent the aircraft radio station over an area having a radius of the order of 200 miles.

If a program originating at a point displaced from the system is to be handled, an aircraft pick-up station may be employed to pick up such a program. For example, an aircraft pick-up station, represented by the reference character 71 (Fig. 5) may be positioned approximately 30,000 feet above the city of Boston, for the purpose of receiving from a ground radio station in Boston a radio program. The pick-up station may be similar to that represented by the aircraft radio station 34 of Fig. 6. However, since the pick-up aircraft ordinarily will be employed primarily for relaying purposes, the equipment thereon need not be quite so extensive as that shown in Fig. 6.

The pick-up station 71 relays the program originating in Boston to the aircraft radio station 19 positioned above New York city. From this point on, the program is handled in a manner similar to the handling of a program originating in New York city and transmitted from a ground radio station in New York city to the aircraft radio station 19.

Although the invention has been described with reference to certain specific embodiments thereof, numerous modifications are possible. Therefore, the invention is to be restricted only by the appended claims, as interpreted in view of the prior art.

I claim as my invention:

1. In a system for transmitting radio signals, aircraft means adapted to operate at a substantial height relative to the surface of the earth, means for directionally transmitting a radio signal from the surface of the earth towards the aircraft means, means disposed on the aircraft means for receiving the radio signal, means for transmitting from the aircraft means a radio signal corresponding to, and controlled by, the first-named radio signal, and means responsive to the radio signal received by the receiving means for maintaining the aircraft means adjacent a predetermined location relative to the earth for continuous reception of the first-named radio signal.

2. A system for broadcasting electromagnetic radiation including means disposed on the ground for transmitting electromagnetic radiation, said means including a directional zenith radiator, an aircraft, receiving means, on said aircraft, for said electromagnetic radiation transmitted from the ground, said aircraft being so disposed as to receive the radiation directly from said directional zenith radiator and means on said aircraft for transmitting electromagnetic radiation the character of which is determined by the radiation received by said receiving means.

3. In a system for transmitting radio signals, aircraft means adapted to operate at a substantial height relative to the surface of the earth, means disposed on the aircraft means for receiving a radio signal, means for transmitting from the aircraft means a radio signal controlled by the first-named radio signal, and means responsive to the first-named signal for maintaining said aircraft in a path such that the average field intensity of the signal received by said receiving means lies between predetermined limits.

4. In combination an aircraft including a receiver-transmitter, said aircraft being operated continuously above a predetermined limited region of the surface of the earth and a ground transmitter in said region including a zenith directional antenna for transmitting radiation to the receiver-transmitter on said aircraft, said receiver-transmitter retransmitting radiation dependent on said received radiation, said aircraft being operated continuously in the field of said zenith directional antenna.

5. In a system for transmitting radio signals, aircraft means adapted to operate at a substantial height relative to the surface of the earth, means disposed on the aircraft means for receiving a radio signal, means for transmitting from the aircraft means a radio signal controlled by the first-named radio signal, and means responsive to the first-named signal for maintaining said aircraft in a path such that a predetermined property of the signal received by said receiving means lies between predetermined limits.

6. In a system for transmitting radio signals for communication purposes, aircraft means adapted to operate at a substantial height relative to the surface of the earth, means disposed on the aircraft means for receiving a radio signal modulated in accordance with a communication, means for transmitting from the aircraft means another radio signal controlled by the first-named radio signal and modulated in accordance with said communication, and means responsive to the first-named signal for maintaining the receiving means in a path such that the field from said first-named radio signal lies between predetermined limits.

7. Apparatus for communicating with an aircraft including means for receiving electromagnetic radiation and for transmitting electromagnetic radiation of a character dependent on said received radiation, comprising ground transmitting apparatus including a directional zenith radiator, said aircraft being operated continuously in the field of said directional zenith radiator.

8. Apparatus for communicating with an aircraft including means for receiving electromagnetic radiation and for transmitting electromagnetic radiation of a character dependent on said received radiation, comprising in combination, means for producing high frequency electrical oscillations, means for modulating said oscillations and a directional zenith radiator for transmitting the modulated oscillations, the last said combination being adapted to be disposed on the ground, said aircraft to operate continuously in the field of said directional zenith radiator.

9. Apparatus for communicating with an aircraft including means for receiving electromagnetic radiation and for transmitting electromagnetic radiation of a character dependent on said received radiation, comprising in combination, means for producing high frequency electrical oscillations, audio and video means for modulating said oscillations and a directional zenith radiator, for transmitting the modulated oscillations, the said combination being adapted to be disposed on the ground and said aircraft to operate continuously in the field of said directional zenith radiator.

10. In a system for transmitting radio signals, aircraft means adapted to operate at a substantial height relative to the surface of the earth, means disposed on the aircraft means for receiving a radio signal modulated in accordance with a program to be broadcast, means for broadcasting from the aircraft means a radio signal controlled by the first-named radio signal and modulated in accordance with said program, and means responsive to the first-named signal for maintaining said aircraft in a path such that a predetermined property of the signal received by said receiving means lies between predetermined limits.

11. In a system for transmitting radio signals, aircraft means adapted to operate at a substantial height relative to the surface of the earth, means disposed on the aircraft means for receiving a radio signal modulated in accordance with a program to be broadcast, means for broadcasting from the aircraft means a radio signal controlled by the first-named radio signal and modulated in accordance with said program, and means responsive to the first-named signal for maintaining said aircraft in a path such that the average filed intensity of the signal received by said receiving means lies between predetermined limits.

12. In a system for transmitting radio signals for communication purposes, aircraft means adapted to operate at a substantial height relative to the surface of the earth, means disposed on the aircraft means for receiving a radio signal modulated in accordance with a communication, means for transmitting from the aircraft means a radio signal controlled by the first-named radio signal and modulated in accordance with said communication, and means responsive to the field strength of said first-named signal for maintaining the receiving means in a path such that said field strength remains between predetermined limits.

CHARLES E. NOBLES.

REFERENCES CITED

The following references are of record in the file of this patent:

UNITED STATES PATENTS

| Number | Name | Date |
|---|---|---|
| 806,052 | Blackmore | Nov. 28, 1905 |
| 1,525,783 | Trenor | Feb. 10, 1925 |
| 1,624,966 | Morris | Apr. 19, 1927 |
| 1,939,345 | Gerth et al. | Dec. 12, 1933 |
| 1,945,952 | Nicolson | Feb. 6, 1934 |
| 1,981,884 | Taylor et al. | Nov. 27, 1934 |
| 2,027,530 | Hammond | Jan. 14, 1936 |
| 2,028,857 | Zworykin | Jan. 28, 1936 |
| 2,127,572 | Peterson | Aug. 23, 1938 |
| 2,140,730 | Batchelor | Dec. 20, 1938 |
| 2,155,821 | Goldsmith | Apr. 25, 1939 |
| 2,252,083 | Luck | Aug. 12, 1941 |
| 2,288,102 | Meredith | June 30, 1942 |
| 2,321,698 | Nolde | June 15, 1943 |
| 2,369,622 | Toulon | Feb. 13, 1945 |
| 2,407,275 | Hays | Sept. 10, 1946 |
| 2,421,017 | Deloraine et al. | May 27, 1947 |

FOREIGN PATENTS

| Number | Country | Date |
|---|---|---|
| 358,972 | Great Britain | Oct. 16, 1931 |
| 844,430 | France | Apr. 24, 1939 |

OTHER REFERENCES

"Airplane Station Will Broadcast . . .," Chicago Evening Post Radio Magazine, August 13, 1925.

"Television Planes Spy on Enemy Lines," Popular Science, December 1939, pages 82 to 83.

"Battle Radio Tricks," Radio Craft, July 1945, pages 638 and 633.

"Television Reception in an Airplane," R. C. A. Review, January 1940, pages 286–289.

"Television Equipment for Guided Missiles," Proc. I. R. E., January 1946, pages 375 to 401.